United States Patent Office 3,386,241
Patented June 4, 1968

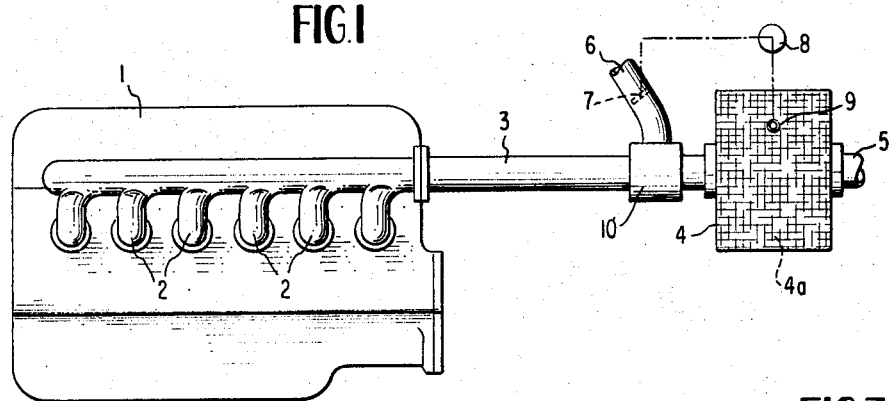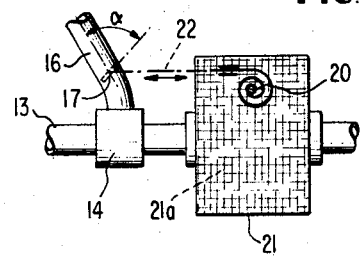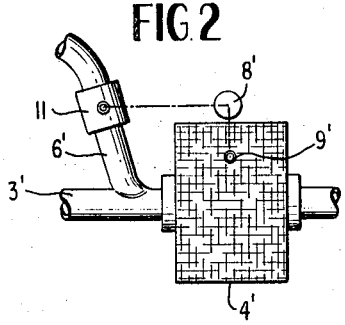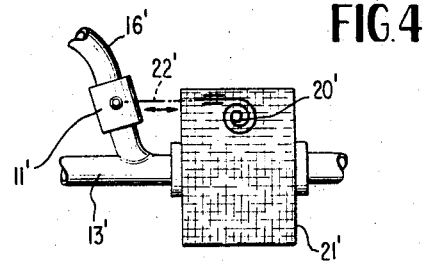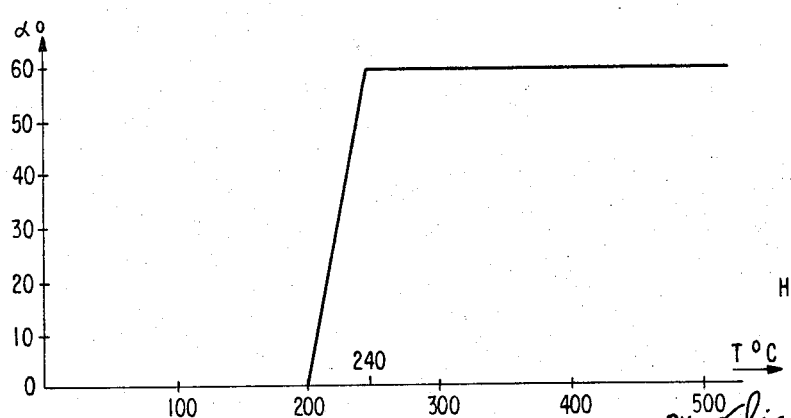

3,386,241
PROCESS AND APPARATUS FOR AFTERBURNING EXHAUST GASES OF INTERNAL COMBUSTION ENGINES
Helmut Säufferer, Waiblingen, Germany, assignor to Daimler-Benz Aktiengesellschaft, Stuttgart-Unterturkheim, Germany
Filed Dec. 8, 1965, Ser. No. 512,468
Claims priority, application Germany, Dec. 10, 1964, D 46,014
10 Claims. (Cl. 60—30)

The present invention relates to a process for the catalytic afterburning of the exhaust gases of internal combustion engines with the admixture of secondary air and to an apparatus for carrying out this process.

With a known process of this type, secondary air is added or admixed to the exhaust gases at a predetermined admixture rate and this gas mixture then reaches a catalyst pot in which takes place the catalytic afterburning; however, only when the gas mixture exceeds a predetermined temperature—namely, the starting or operating temperature of the catalyst—will the catalytic afterburning take place.

During the starting of a cold internal combustion engine, initially the parts of the catalyst installation and the associated pipes or lines have to be heated up by the hot exhaust gases before the starting or operating temperature of the catalyst is reached; i.e., before the temperature is reached at which the catalyst becomes effective. This warm-up operation is delayed with the known processes by the cold secondary air. Since this secondary air is not needed during the warm-up phase because during this phase no after-burning can take place, according to the present invention the secondary air is added only after the expiration of a warm-up phase.

The warm-up phase during which the exhaust gases reach the atmosphere uncombusted is, therefore, shortened by the present invention.

Similar circumstances as occur during the starting of an internal combustion engine, also exist if during the operation of the engine the temperature falls below that temperature at which the catalytic after-burning can take place. Also during such operating phases during which the catalytic afterburning stops, the installation has to be heated up again. This heating or warm-up operation is also delayed with the known process by the secondary air which is not needed during this phase but nevertheless is added at that time. For that reason, the secondary air is admixed according to a further appropriate feature and development of the present invention in dependence on the catalyst temperature. Since the starting temperature for different catalysts differs corresponding to the temperature range for which they are designed, also the secondary air supply or admixture takes place in each case according to the type of the catalyst in question and/or according to the composition thereof at a temperature which may be different for different catalysts. Preferably, the secondary air is added or admixed, beginning with a catalyst temperature below the starting or operating temperature for the catalytic after-burning with an ever increasing admixture rate as the temperature rises so that the admixture rate reaches its operating value when the catalyst is heated essentially to its starting or operating temperature.

A preferred installation for realizing the process according to the present invention is characterized in that an admixture connecting piece having a thermally controlled throttling device is provided which discharges into the exhaust line upstream of the catalyst pot.

If the secondary air supply does not take place by means of a separately driven blower or compressor, it is recommended in accordance with the present invention to connect the admixture connecting piece to the exhaust gas line by the interconnection of an air-injector.

If one utilizes a mechanically driven air pump for the secondary air supply, then the thermal control can be realized directly at the air pump in that the supply quantity of the air pump is controlled in dependence on the measured temperature values.

A thermo-sensitive device of any conventional construction is thereby appropriately provided in the catalyst pot for the thermal control.

The catalyst temperature is determinative for the control of the throttling installation or of the secondary air supply. The thermo-sensing device is therefore appropriately so arranged in the catalyst pot that it measures the catalyst temperature. In such a case, an optimum manner or operation may be achieved in the sense of a shortening of the warm-up period.

Preferably the actuation of the throttle valve or the control of the air pump takes place by means of a bimetallic element accommodated in the catalyst pot which is operatively connected by way of a linkage with the air pump or the throttling device. A simple throttle valve may be provided in such a case as throttling means. The bimetallic element is appropriately arranged in direct heat contact with the catalyst mass of the catalyst so that the adjustments, which are caused by the bimetallic element, become dependent directly on the temperature of the catalyst mass.

Instead of controlling the air pump in its supply quantity, it may also be satisfactory in a more simple construction of the present invention if the air pump is merely turned on and off. The air pump will then be turned on, and more particularly to the full output thereof, shortly before the catalyst has reached the starting temperature thereof. The turning off of the air pump takes place shortly before the temperature drops below this starting temperature.

Accordingly, it is an object of the present invention to provide a process and installation for the after-burning of exhaust gases of internal combustion engines which avoids, by extremely simple means, the afore-mentioned shortcomings and drawbacks encountered with the prior art constructions.

Another object of the present invention resides in a novel and improved process for the after-burning of exhaust gases as well as in an apparatus capable of realizing such process which considerably reduces the warm-up period necessary to warm-up the various parts to the predetermined starting temperature while at the same time facilitating the maintenance of proper operation of the catalytic after-burning for the internal combustion engine.

A further object of the present invention resides in a control system for so controlling the supply of secondary air for the after-burning installation that secondary air is supplied only when the temperature of all the involved parts warrants the same for an effective afterburning.

Still another object of the present invention resides in a process for after-burning the exhaust gases of internal combustion engines and to an apparatus for carrying out such process which enables the obtainment of optimum operating conditions in the sense of a shortening of the warm-up period necessary at any given time to warm-up the various parts of the installation to the proper operating temperature.

These and further objects, features, and advantages of the present invention will become more obvious from the following description when taken in connection with the accompanying drawing which shows, for purposes of illustration only, several embodiments in accordance with the present invention, and wherein:

FIGURE 1 is a somewhat schematic elevational view of a first embodiment of an after-burning installation for internal combustion engines according to the present invention provided with a thermo-controlled throttle valve;

FIGURE 2 is a somewhat schematic partial elevational view of a second modified embodiment of an after-burner installation in accordance with the present invention provided with a thermo-controlled air pump;

FIGURE 3 is a somewhat schematic partial elevational view of a third embodiment of an after-burner installation; in accordance with the present invention provided with a throttle valve controlled by a bimetallic element;

FIGURE 4 is a somewhat schematic partial elevational view of a still further modified embodiment of an after-burner installation in accordance with the present invention provided with an air pump controlled by means of a bimetallic element; and FIGURE 5 is a diagram illustrating the admixture of secondary air in dependence on the temperature, such as catalyst temperature or exhaust gas temperature.

Referring now to the drawing wherein like reference numerals are used throughout the various views to designate corresponding parts, and more particularly to FIGURE 1, reference numeral 1 designates therein a conventional internal combustion engine whose individual exhaust pipes 2 are connected to a common exhaust line 3. The exhaust line 3 terminates in a catalyst pot 4 of any conventional construction which is filled with a catalyst mass 4a also of any conventional known type. The catalytic after-burning of the exhaust gases takes place within the catalyst pot 4. A conventional exhaust line 5 leads from the catalyst pot 4 into the atmosphere, possibly by way of a muffler.

Reference numeral 6 designates in FIGURE 1 a connecting piece or pipe for the secondary air supply which discharges into the exhaust gas line 3 upstream of the catalyst pot 4 with the interconnection of a conventional air injector 10 and which is adapted to be closed shortly upstream of the discharge orifice thereof by means of a pivotal throttle valve 7. A control device 8 of any known conventional construction which may be a mechanical, electrical, hydraulic or other known actuator is provided for the adjustment of the throttle valve 7; the control device 8 is connected to a thermo-sensing device 9 also of conventional construction. The thermo-sensing device 9 which is sensitive to temperature extends into the catalytic mass 4a so that it measures directly the temperature thereof. Since the control device 8 as well as the thermo-sensitive device 9 may be of any conventional known construction and form no part of the present invention, a detailed showing thereof is dispensed with herein.

*Operation*

The operation of the installation shown in FIGURE 1 will now be explained by reference to the diagram illustrated in FIGURE 5. In this diagram the opening angle $\alpha$ of the throttle valve 7 is plotted against the temperature T which is measured by the thermo-sensing device 9. It is assumed that the catalytic after-burning starts at a temperature $T=240$ C. and that the throttle valve 7 is opened as wide as possible with an opening angle $\alpha=60°$ and more particularly is opened so far that the secondary air is drawn in at an admixture rate which is sufficient for the catalytic after-burning, and that the throttle valve 7 is closed at an opening angle of $\alpha=0°$. It is further assumed that the catalytic after-burning stops if the temperature at the thermo-sensing device 9 drops below the value of $T=200°$ C.

During the start of the cold internal combustion engine 1 the throttle valve 7 is closed because the catalyst 4a is cold. If the temperature T in the catalyst 4a rises in the course of the warm-up phase to a value shortly below the starting temperature $T=240°$ C., in the given example to a temperature of about $T=200°$ C., then the throttle valve 7 begins to open under the influence of the control apparatus 8 and the opening increases with rising catalyst temperature—as indicated by the curve in FIGURE 5—until it reaches its maximum value $\alpha=60°$ at the temperature $T=240°$ C. The catalytic after-burning commences at the starting temperature $T=240°$ C. The installation now is in the normal operating condition in which the exhaust gases are catalytically after-burned and also the secondary air necessary therefore is admixed. If the temperature at the thermo-sensing device 9 drops below the operating temperature of the catalyst $T=240°$ C., then the throttle valve 7 is closed by the control apparatus 8 with the dropping of the temperature T. This may occur under certain operating conditions of the engine if, for example, only a very low concentration of carbon monoxide or hydrocarbons is present in the exhaust gases thereof. In such a case the secondary air is not needed because no after-burning can take place. Consequently, under such an operating condition the secondary air would only contribute in a disadvantageous manner to a further cooling off of the catalyst.

A second embodiment is illustrated in FIGURE 2 in which those parts such as the exhaust line, the connecting piece, the control apparatus, the thermo-sensing device, and the catalyst pot corresponding to analogous parts of FIGURE 1, are designated by primed reference numerals 3', 6', 8', 9' and 4' respectively. In the embodiment of FIGURE 2, however, an air-injector corresponding to the air-injector 10 of FIGURE 1 is not provided. In lieu thereof an air pump 11, for example, an electrically driven air pump for the secondary air supply is arranged in the secondary air connecting piece 6' which pump is controlled by the control apparatus 8' of conventional construction, and more particularly in such a manner that the secondary air supply takes place according to the same principles as described in connection with FIGURE 1 by reference to FIGURE 5.

A third embodiment in accordance with the present invention is illustrated in FIGURE 3. The exhaust gas line corresponding to the exhaust gas line 3 of FIGURE 1 is designated in FIGURE 3 by reference numeral 13. This exhaust gas line 13 terminates in a catalyst pot 21 which corresponds to the catalyst pot 4 of FIGURE 1. Reference numeral 16 designates the secondary air connection such as a pipe connecting piece or the like which discharges into the exhaust gas line 13 by the interposition of an air injector 14 and is adapted to be closed in proximity to its orifice by means of an adjustable throttle valve 17. A bimetallic spiral 20 of conventional construction is arranged in the catalyst pot 21 which bimetallic spiral 20 is in direct heat contact with the catalytic mass 21a. The bimetallic spiral 20 is connected with the throttle valve 17 by means of a linkage 22 extending out of the catalyst housing 21 so that the throttle valve 17 is controlled in dependence on the catalst temperature according to the same considerations as already explained hereinabove in connection with FIGURE 1 by reference to FIGURE 5.

A still further modified embodiment in accordance with the present invention is illustrated in FIGURE 4 in which the parts corresponding to those of FIGURE 3 are designated by primed reference numerals 13', 20', 21' and 22'. The secondary air connection 16' discharges in FIGURE 4 directly into the exhaust gas line 13'. On air injector corresponding to the air injector 14 of FIGURE 3 does not exist in FIGURE 4. In lieu thereof, an air pump 11' is provided for the secondary air supply, as also in the illustrated embodiment of FIGURE 2, whose supply quantity is so controlled by the bimetallic spiral 20' by way of the linkage 22' that the secondary air supply takes place according to the same considerations explained hereinabove in connection with FIGURE 1 by reference to FIGURE 5.

In the embodiments of FIGURES 2 and 4, instead of using an air pump which is adapted to be controlled in its supply quantity, also such an air pump may be provided which is merely adapted to be turned on and off. In such a case the air pump is turned on and off at a catalyst temperature of about 240° C.

While I have shown and described several embodiments in accordance with the present invention, it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:

1. In a process for the catalytic afterburning of the exhaust gases of internal combustion engines, with secondary air supply in the presence of a catalyst being operative only above a fixed starting temperature substantially above the ambient temperature, the improvement comprising the steps of: supplying the secondary air for admixture only after the expiration of a warm-up phase determined by the catalyst temperature during which substantially only exhaust gases flow through said catalyst; supplying and admixing the secondary air at a rate increasing with increasing catalyst temperature, beginning with a catalyst temperature below the fixed starting temperature and above ambient temperature, and reaching at least the admixture rate operational stoichiometric value when the catalyst has reached essentially the fixed starting temperature.

2. An installation for the catalytic afterburning with secondary air supply, of the exhaust gases of internal combustion engines, comprising: exhaust gas line means for collecting and conducting exhaust gases from an internal combustion engine to the atmosphere including a catalyst housing in flow communication with the exhaust gases and a catalyst within said housing in flow communication having a fixed starting temperature substantially above the ambient temperature; secondary air supply means connected with said exhaust line means for supplying secondary air to the exhaust gases; control means for controlling the secondary air supply so that secondary air is added only after the expiration of a warm-up phase determined by the catalyst temperature during which substantially only exhaust gases flow through said catalyst housing; said control means including temperature responsive means for adding the secondary air substantially in dependence of the catalyst temperature at a rate increasing with increasing catalyst temperature, beginning with a catalyst temperature below the fixed starting temperature for the catalyst and substantially above the ambient temperature, and reaching at least the admixture rate operational stoichiometric value when the catalyst has reached a fixed starting temperature thereof.

3. The combination according to claim 2, wherein said secondary air supply means is connected with said exhaust line means upstream of said housing means.

4. The combination according to claim 2, wherein said control and supply means includes air pump means, and wherein said control means includes a bimetallic element arranged in the catalyst housing means operatively connected with said air pump means by way of a linkage to adjust the supply output of said air pump means.

5. The combination according to claim 3, wherein said control and supply means includes thermally controlled throttle valve means for throttling the secondary air flow in said secondary air supply means in dependence on the catalyst temperature.

6. The combination according to claim 3, wherein said control and supply means includes thermally controlled air pump means for varying the air flow in dependence on the catalyst temperature.

7. The combination according to claim 5, wherein said throttle means includes a throttle valve, and said control means includes a bimetallic element in said catalyst housing means operatively connected with said throttle valve by way of a linkage.

8. The combination according to claim 5, further comprising air injector means fluid interposed between the discharge of said secondary air supply means and said exhaust gas line means.

9. The combination according to claim 8, wherein said control means includes temperature-sensitive means in the catalyst housing means.

10. The combination according to claim 6, wherein said control means includes temperature-sensitive means in the catalyst housing means.

References Cited

UNITED STATES PATENTS

| | | | |
|---|---|---|---|
| 2,973,490 | 5/1960 | Calvert | 60—30 |
| 3,086,353 | 4/1963 | Ridgway | 60—30 |

FOREIGN PATENTS 892,659  3/1962  Great Britain.

RALPH D. BLAKESLEE, *Primary Examiner.*

MARK M. NEWMAN, *Examiner.*